United States Patent [19]

Fleming et al.

[11] Patent Number: 4,971,189

[45] Date of Patent: * Nov. 20, 1990

[54] MULTI-STATION ASSEMBLY APPARATUS

[75] Inventors: Marc A. Fleming, Cardiff; LaMonte D. Porter, San Marcos, both of Calif.

[73] Assignee: Hunter Industries, San Marcos, Calif.

[ * ] Notice: The portion of the term of this patent subsequent to Apr. 25, 2006 has been disclaimed.

[21] Appl. No.: 341,921

[22] Filed: Apr. 24, 1989

Related U.S. Application Data

[63] Continuation-in-part of Ser. No. 150,987, Feb. 1, 1988, Pat. No. 4,823,929.

[51] Int. Cl.$^5$ .............................................. B65G 43/00
[52] U.S. Cl. .................................. 198/346.1; 198/349; 198/465.2; 29/33 P
[58] Field of Search ...................... 198/345, 346.1, 349, 198/351-354, 465.1, 469.2; 29/33 P, 563

[56] References Cited

U.S. PATENT DOCUMENTS

| | | | |
|---|---|---|---|
| 3,123,200 | 3/1964 | Donaldson | 198/353 |
| 3,315,778 | 4/1967 | Kendall et al. | 198/345 |
| 3,527,087 | 9/1970 | Converse et al. | 198/345 |
| 4,371,075 | 2/1983 | Erlichman | 198/345 |
| 4,502,585 | 3/1985 | Sticht | 198/345 |
| 4,583,631 | 4/1986 | Yonezawa et al. | 198/345 |
| 4,611,704 | 9/1986 | Burgess | 198/465.1 |
| 4,678,077 | 7/1987 | Bertorello | 198/345 |
| 4,703,843 | 11/1987 | Dixon | 198/345 |
| 4,711,343 | 12/1987 | Dixon | 198/465.2 |
| 4,823,929 | 4/1989 | Fleming et al. | 198/345 |

*Primary Examiner*—Joseph E. Valenza
*Attorney, Agent, or Firm*—Baker, Maxham, Jester & Meador

[57] ABSTRACT

A modular assembly line apparatus for automatically assembling multiple component devices, such as sprinkler units and the like, includes a central support table including upper and lower reference rails for mounting assembly fixtures and mechanisms, high and low pressure air manifolds built into the table, a conveyor for continuously moving support pallets along the table, and multiple independent work stations with pallet stop and support fixtures responsive to indicators on the pallets for selectively stopping and supporting work pieces for programmed work or assembly functions.

10 Claims, 5 Drawing Sheets

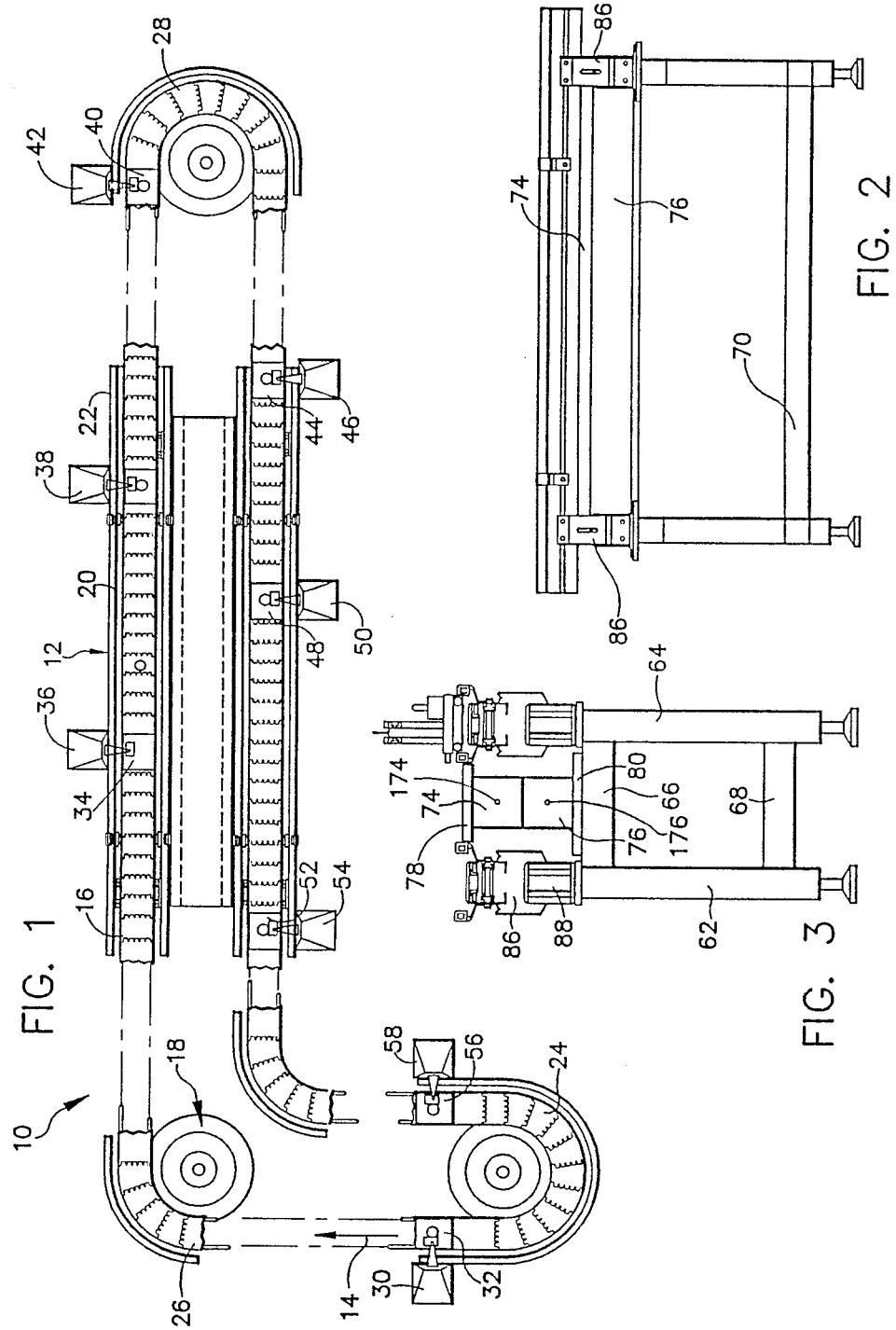

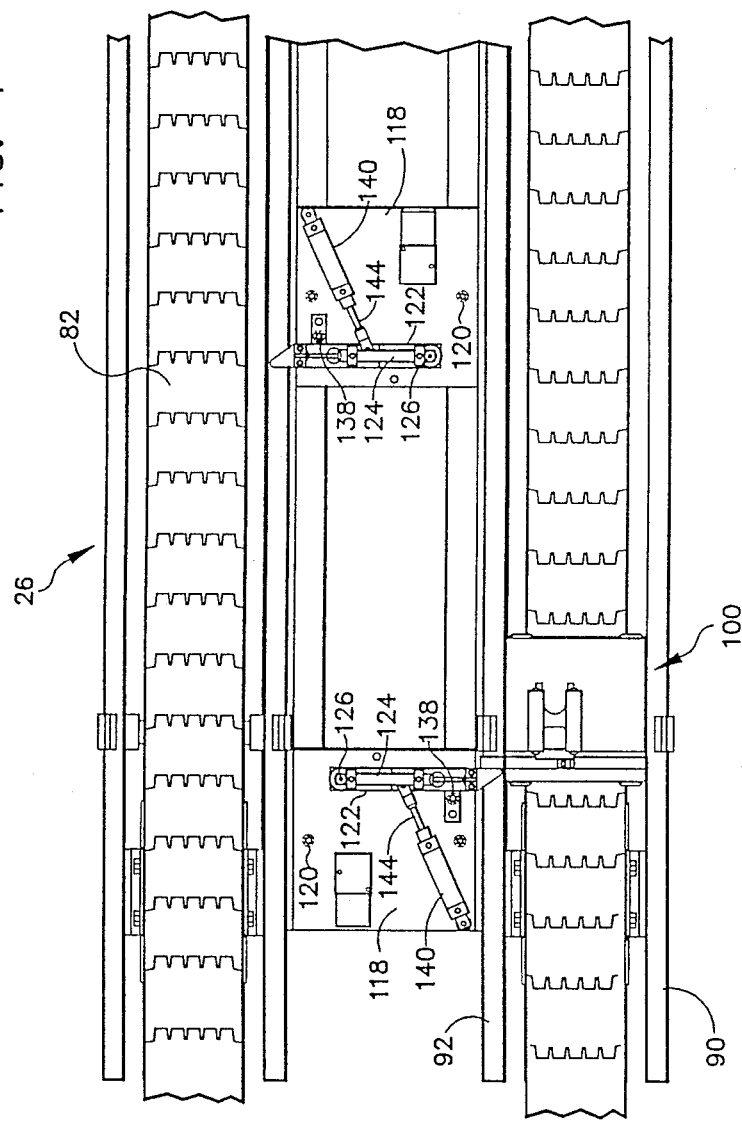

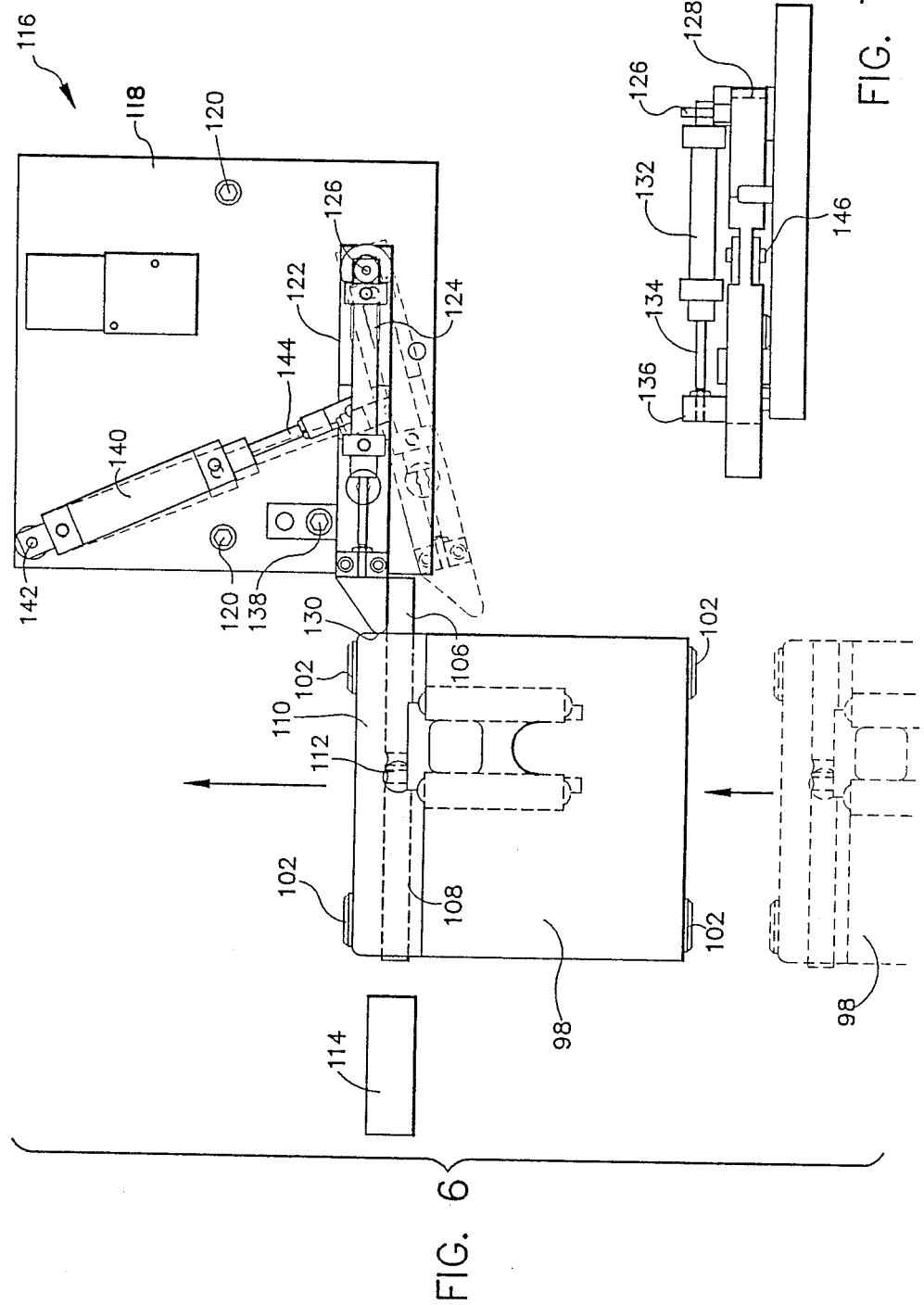

MULTI-STATION ASSEMBLY APPARATUS

REFERENCE TO RELATED APPLICATIONS

The present application is a continuation-in-part of application Ser. No. 07/150,987, filed Feb. 1, 1988, entitled "MULTI-STATION ASSEMBLY MACHINE", for which U.S. Pat. No. 4,823,929 will be issued Apr. 25, 1989.

BACKGROUND OF THE INVENTION

The present invention relates to automated assembly line manufacturing, and pertains particularly to a modular assembly unit for setting up an assembly line system having multiple stations for multiple assembly functions.

Multi-station automated assembly apparatus for the assembling of various devices have been known heretofore. These assembly apparatus, however, have been typically custom constructed for assembling a particular device or apparatus, or at most minor variations in devices.

It is desirable that modular assembly apparatus be available that can be adapted to the formation of any number and length of assembly lines, with any number of assembly stations to perform a wide variety of assembly operations and capable of assembling a wide variety of devices.

SUMMARY AND OBJECTS OF THE INVENTION

It is the primary object of the present invention to provide an improved modular assembly apparatus.

In accordance with a primary aspect of the invention, a modular assembly line system for carrying out multiple manufacturing and/or assembly operations, comprises an elongated support structure, including a plurality of horizontally extending mounting rails, tubular manifold means operatively associated with said support structure for providing at least two sources of pressurized fluid, each at a different pressure, conveyer means extending along opposite sides of said support structure for transporting articles of manufacture therealong, work piece carrying means releasably carried on said conveyer means, and means for establishing a plurality of work stations along said support structure, including first means for selecting a work piece from said conveyer means in response to an indicator carried by said work piece carrying means, second means for positioning said work piece for enabling an operation to be performed on said work piece.

BRIEF DESCRIPTION OF THE DRAWING

The above and other objects and advantages of the present invention will become apparent from the following description when read in conjunction with the accompanying drawing wherein:

FIG. 1 is a top plan view of an assembly apparatus embodying the invention;

FIG. 2 is a side elevation view of a modular unit in accordance with the invention;

FIG. 3 is an end elevation view of the unit of FIG. 2;

FIG. 4 is an enlarged top view of the modular unit of FIG. 2.;

FIG. 6 is an enlarged view of a stop mechanism and a pallet;

FIG. 7 is a side elevation view of the pallet of FIG. 6; and

DETAILED DESCRIPTION OF A PREFERRED EMBODIMENT

Figure 5:
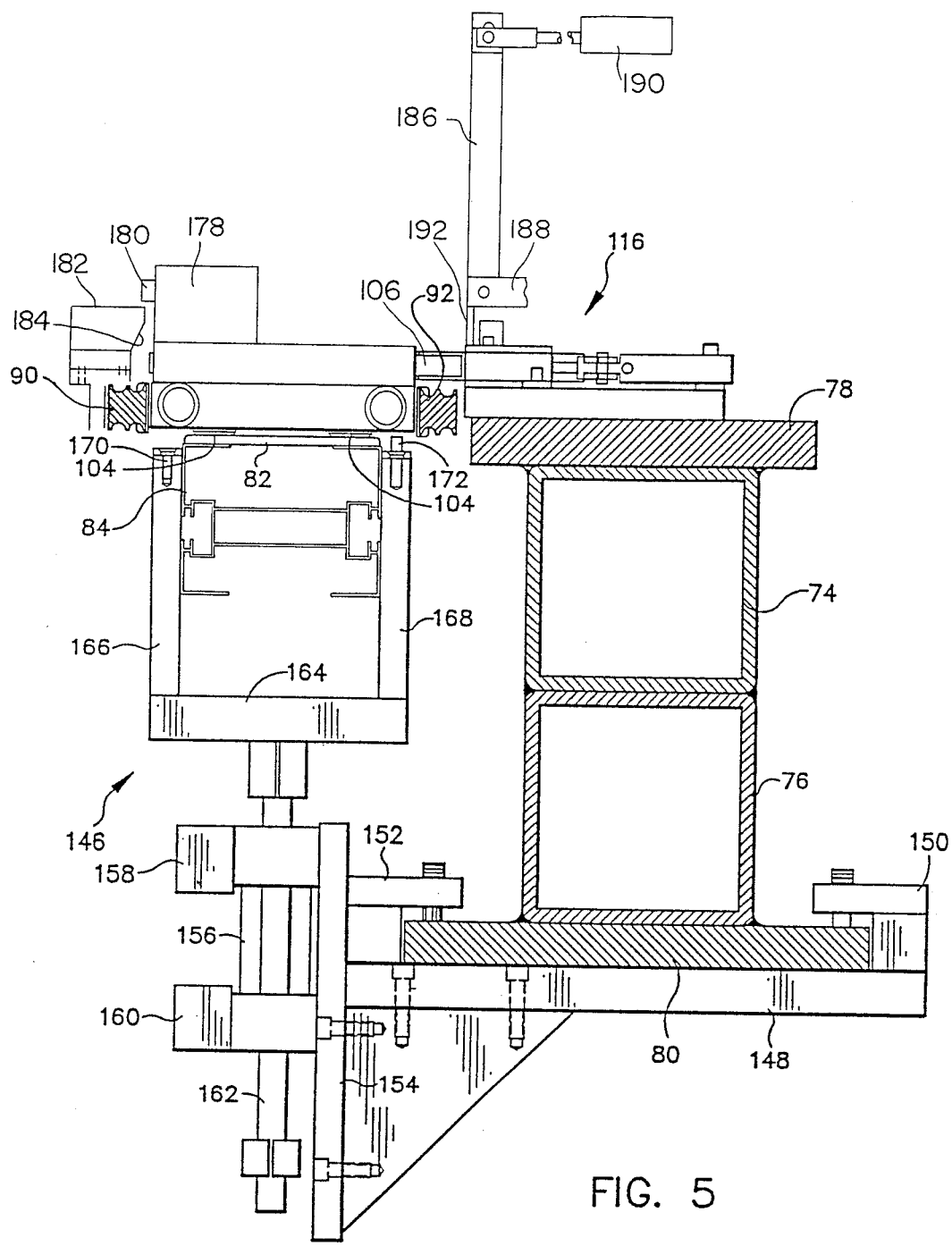
FIG. 5 is an enlarged section view taken generally on line 5—5 of FIG. 2.

Referring to FIG. 1 of the drawing, there is schematically illustrated a manufacturing assembly line for the automatic assembly of an article of manufacture. The assembly line or assembly system, designated generally by the numeral 10, incorporates a plurality of modular units, which are substantially identical, designated generally by the numeral 12, which combine to make up a selected assembly line or system. The modular units, as will be more fully described, are designed to be put together to form an assembly line apparatus and may constitute one or any number of modular units that form a complete assembly line for manufacturing of any one of a number of selected products. As illustrated in the exemplary system, the modular units are put together end to end, with a unit 14 interconnected to an adjacent unit 16 at right angles thereto, with a corner or transition unit 18 connected therebetween. A further pair of units 20 and 22 are positioned end to end and form a generally elongated L-shaped assembly line. As will be appreciated, the assembly line can be formed from one or any number of modular units and into any number of different configurations as desired.

The exemplary system 10, as illustrated in FIG. 1, provides an assembly line that begins and terminates with the unit 14, which has an end unit 24 for providing for the continuous running of a conveyer along both sides of each unit of the entire system. A similar unit 28 on the end of unit 22 enables the conveyer unit 26 to continue in a continuous endless path around the entire assembly line.

In the illustrated embodiment, unit 14 is the start and end of the system, with for example a first supply source 30 of one component of the article of manufacture delivered to a first work station 32, where the first component part of the article is mounted on a fixture on a pad or pallet that is supported for movement along the conveyer 26. As the pallet moves along the assembly line on the conveyer to a next station 34, another part is supplied and added to the article from a source 36. The pallet then continues along the conveyer to a third assembly station 38 from at which an additional part is supplied from source 38. The pallet then continues to a next station 40 for the addition of another part from a source 42. Similarly, the pallet continues around the conveyer to a subsequent station 44, where a part may again be supplied from an additional source 46. The article continues to additional stations 48 for supply of part from source 50 and station 52, which is for example a final assembly station for the supplying of the final part 54. A final testing and culling station 56 may test the article and either reject the article or direct it to a packaging bin 58 for packaging and shipping.

The present system is designed to be built up of any number of modular units to accommodate as many stations as necessary, and to be arranged in any desired geometric configuration to fit required space or to cooperate with existing assembly line or supply stations.

Referring to FIG. 2 of the drawing, a basic modular unit is illustrated. The basic modular unit comprises a support structure illustrated somewhat in the form of a table or bench. This modular unit comprises generally an upstanding support structure having a pair of vertical support leg units at each end thereof. Each leg unit comprises a pair of vertically extending support legs 62 and 64 connected together by top and bottom cross members 66 and 68. Each leg has an adjustable foot constructed in a known manner.

A longitudinal lower beam 70 extends and is connected between lower cross members 68. A pair of upper longitudinal beams 74 and 76, which in the illustrated embodiment comprises a pair of elongated square cross sectioned tubular members stacked one above the other, forms the upper longitudinal beams of the structure. Upper and lower rails for mounting of assembly apparatus and the like are provided by upper and lower plates 78 and 80, which extend in width outward at the sides beyond the width of the two tubular beam members 74 and 76. The beam members are preferably secured together and between the plates 78 and 80 as by welding. The upper plate 78 forms a combination of a support table and laterally extending mounting rails for the mounting of assembly devices and mechanisms, as seen in FIGS. 3-5. The relative spacing between the upper and lower rails and the laterally spaced edges of the rails are maintained in order to provide a precise reference point from which the assembly mechanisms are mounted for forming the assembly functions. This reduces the number of adjustments and calibration that may otherwise be necessary.

The upper and lower tubular beams 74 and 76 perform additional functions as that of fluid chambers or reservoirs for containing pressurized air or gas. These chambers or reservoirs provide pressure source at a desired PSI, such as thirty PSI and eighty PSI, respectively. Normal positioning mechanisms can be operated from the thirty PSI source, for example, with certain assembly operations operated from the eighty PSI source. These tubular members serve as reservoirs and manifolds for the connection of various assembly mechanisms which are operated thereby. The conveyer system comprises a conveyer belt 26 of a generally known construction, such as for example a plurality of interconnected pad members 82, pivotally or hingedly connected together to be articulated in the manner of a chain, and move around the periphery of the overall system. The conveyer belt 26 is mounted on an elongated box beam track member 84 on each side of the support table. The track member is mounted by suitable bracket units 86 and 88 adjacent the top rail and table member 78 at a position slightly below the upper surface thereof. The conveyer unit is of an off the shelf known construction. A pair of retaining rails 90 and 92 extend along each side of the conveyer belt 26 to aid in retaining pallets and the like on the conveyer. The end units of the conveyer each include a sprocket 94 and 96, which are rotatably mounted in suitable supports not shown, and at least one of which is driven by a motor not shown.

The conveyer belt 26 frictionally carries a plurality of pallets 100, as illustrated in FIG. 4, which are constructed to fit the conveyer and are designed to receive mounting fixtures for the manufacture of an article. The present system was designed particularly for the assembly of pop-up sprinkler units wherein multiple components are assembled to form the ultimate sprinkler unit. The pallets 100 are preferably rather precision formed support members, such as flat rectangular plates of a lightweight material such as aluminum or the like. A plurality of disc-like pads 102 are mounted on the front and rear of the pallet for providing engagement between adjacent pallets. A plurality of like pads 104 are mounted on the under side of the pallets for support of the pallets.

The pallets may have one or more sensing devices mounted thereon, and may also have locating devices, such as precision positioned bores or the like, for receiving positioning mechanisms and the like. An indicator in the form of an elongated rod 106 mounted in a bore 108 of a block 110 on the pallet is positionable in selected positions to indicate a certain condition of the pallet. A detent assembly, such as a spring biased ball and multiple grooves 112, positions the indicator rod 106. Sensing means in the form of a proximity sensor 114, in the illustrated embodiment, senses the position of the indicator rod 106, and either lets the pallet go by or stops it for the performance of an assembly operation. The sensor may take any suitable form, such as magnetic, light beam, etc.

Additional indicators may be added to a pallet for indicating additional functions at one or more stations. As shown in FIG. 5, an indicator comprising a mounting body 178 with a moveable pin or rod 180 which may be mounted on the top of indicator 110. As in the prior embodiment, the pin may be set at different positions to indicate different functions. Additional sensors, (not shown) must also be properly positioned to sense the indicator rod 180. Any number of indicator rods may be placed on a pallet as needed, and one or more to the stations would be provided with the necessary sensors.

These indicator rods also enable the machine to assemble a number of different products at the same time on the same assembly line. The stations are each sufficiently independent that the pallet is simply programmed for particular stations, which are themselves equipped and programmed to perform certain functions on specifically indicated pallets. This system also has the advantage that each pallet does not have to be tracked. For example, a pallet may be removed from the assembly line and placed back on the line out of sequence without affecting the product on it or any other pallet.

The indicator rods may be suitably positioned automatically by mechanisms at the stations to indicate any number of different conditions. These conditions may include completion, particular modification, defect or the like. One such mechanism is a cam block 182 having a cam face 184 engaged by the end of the rod 106 when the pallet is lifted. This device is suitable for the end of the line to neutralize the pallet for reuse. It can also reprogram the pallet for an additional function at a subsequent station.

Another form of means for shifting the indicator rods comprises an arm or lever 186 pivotally mounted on a support arm 188 and actuated by a cylinder 190. A lower end or tip 192 of the lever 186 engages the end of the rod 106, shifting it to the left when the cylinder 190 is activated and the pallet is lifted.

A selector mechanism 16 for stopping the pallets at each assembly or operation station is illustrated for example in FIG. 5, and comprises generally a base plate with selective decelerating and stopping mechanism thereon. The stopping mechanism comprises a base plate 118 of a generally square or rectangular configuration, having means such as bolts or screws 120 for mounting on the support table 78 in a precise location for locating an assembly station. The mechanism comprises a first arm 122 that is of a generally elongated rectangular bar configuration, having a slot 124 in one end for receiving a pivot mount or pin 126 and slide bearing, and a tapered and rounded opposite end 128 for engaging and stopping selected pallets. The arm 122 is extended and retracted by an air cylinder 132 pivotally mounted on the pin 126 at one end, and connected at the connecting rod 134 to bracket 136 on the arm 122. The arm 122 may be extended outward along its axis by a coil spring and retracted by air pressure.

An air spring comprising an air cylinder 140 pivotally mounted by a pin 142 at one end to the base plate 118. The air cylinder 140 includes an air piston mounted therein, and including a piston rod 144 extending from the opposite end of the tubular cylinder, and pivotally connected at its outer end to the first arm 122. This air spring 140 biases the first arm 122 to an angled forward position (shown in phantom) relative to the plate. This angle position is advanced relative to the position of the plate, such that the outer tip 130 of the arm is engaged by the pin 106 on an arriving pallet, and pivots toward a stop against the air spring and stop block or unit 138 as the pallet decelerates and moves to the assembly station. The pallet stop mechanism when used in conjunction with a lift station automatically resets itself without external controls when the pallet is lifted. When the pallet is raised, the pin 106 slips above tip 130 and disengages therefrom.

The sensing unit 114 at the station functions to determine if an assembly function is to be performed on the part on the pallet. If no function is to be performed, the stop arm assembly retracts by activation of cylinder 132 to withdraw tip 134, which releases the pallet 98 and permits it to continue to the next station.

If the sensing mechanism senses that an operation is to be performed on the part carried by the pallet, a positioning mechanism, as illustrated in FIG. 5, is actuated to selectively position the pallet and fixture mounted thereon at the work station for performing an assembly or other function.

Referring specifically to FIG. 5, there is illustrated a positioning mechanism, designated generally by the numeral 146, for selectively positioning pallets at work stations for performing manufacturing functions. The positioning mechanism functions to lift the pallet 98 from the surface of the conveyer, and to hold it in a predetermined fixed elevated position above the conveyer to permit the assembly function to be performed. The lift mechanism may also perform a pressing function, either along with or in addition to the lift function.

As illustrated in FIG. 5, the positioning mechanism comprises mounting structure for mounting the positioning apparatus to the lower rail, including an elongated plate 148 having opposed generally U-shaped clamps 150 and 152 at opposite sides or ends thereof for extending over and clamping to opposite side edges of the lower rails 148. A vertical mounting plate 154 is secured to the end of the rail clamp, and includes an actuating cylinder 156 mounted by brackets 158 and 160 thereto for supporting the cylinder, and a piston rod 162 extending vertically upward, and on which is mounted the lifting cradle comprising a horizontal plate 164, and vertical side plates 166 and 168 having positioning bores 170 or pins 172 at the upper surface thereof for engaging positioning bores in the pallet 98. The cylinder 156 is preferably a two stage cylinder for performing a two position lifting function, or both lifting and pressing functions. The first stage would be a lifting function at a lower pressure. The second stage would be a pressing function and operated at a higher pressure. Such multistage or step cylinders are known and the details thereof are not believed necessary herein. They operate a number of different ways, including air stops that are effective at a lower pressure but overcome by a higher pressure.

The lateral or side plate members 166 and 168 of the lifting cradle extend to each side of the conveyer and engage the lateral side edge portions of the pallet extending over the sides thereof for selectively positioning and holding the pallet and fixture thereon for an assembly function to be performed thereon.

As soon as the assembly function is completed at the station, the positioning mechanism releases or retracts the pallet, setting it back on the conveyer, permitting it to move on to the next station. Each station may be similarly equipped with the positioning mechanism, particularly if an assembly function is to be performed.

Any number of the station units may be mounted on any one of the modular units as space permits. In order to accommodate sufficient space and stations, modular units may be positioned together, as explained above, end to end with a direct connection thereof and a continuation of the conveyer around the respective sides thereof. A one-hundred eighty degree conveyer turn assembly (FIG. 1) may be mounted at the terminal ends of the modular unit to reverse or turn the conveyer around to extend along the opposite side of the support structure. Similarly, ninety degree turn units (FIG. 1) may be used to turn the conveyer to extend along the side of a modular unit extending at right angles to an adjacent unit.

The conveyer unit, as illustrated in the present system, is a continuous unit extending around the entire assembly structure. Details of the conveyer unit are not shown, as any number of suitable units are available on the market that can be mounted on and combined with the assembly unit as described herein.

The assembly unit as described herein is designed primarily for assembly mechanism to be operated by compressed air, but can accommodate mechanisms operated by hydraulic and electrical systems. The tubular members 74 and 76 (FIGS. 2, 3, and 5) form compressed air manifolds with suitable quick connect air hose couplings (not shown) for each of the assembly stations. Suitable couplings or connectors 174 and 176 (FIG. 3) are also provided to a suitable source of compressed air and to adjacent manifolds. The two manifolds would be connected to the existing factory source of compressed air of 100–200 PSI through suitable regulators to provide different pressures of 30–40 and 60–80 PSI for example in the two manifolds.

Figure 8:
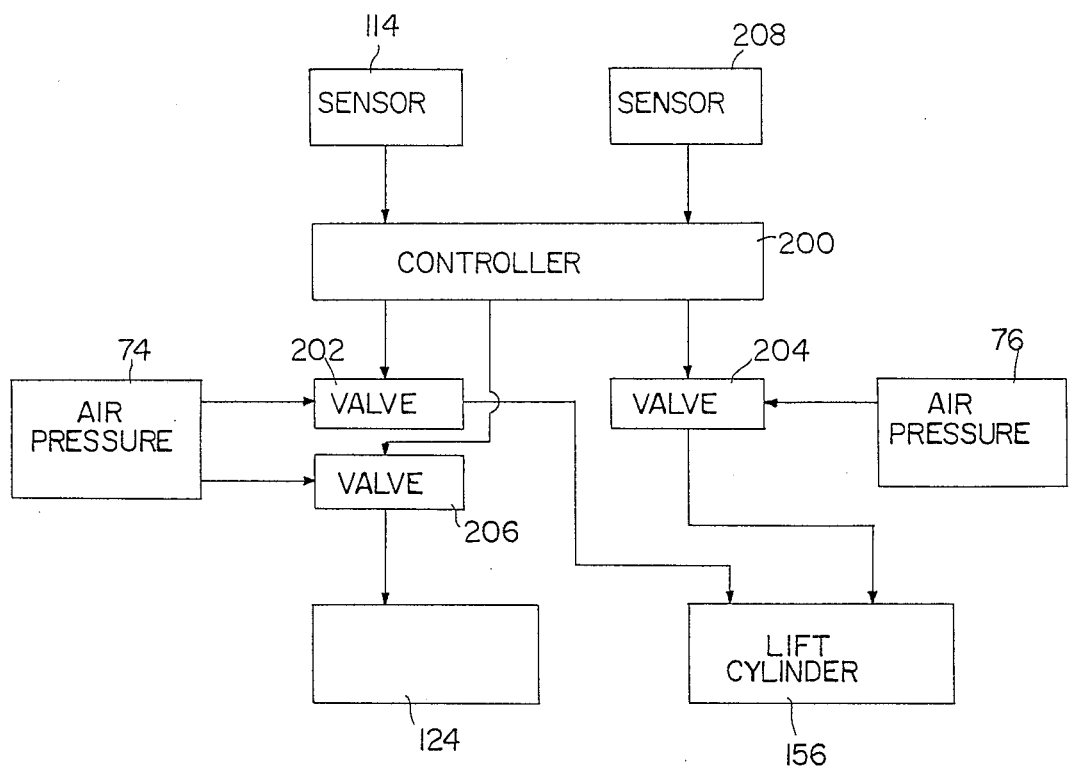
FIG. 8 is a schematic view of the control system.

Referring to FIG. 8 of the drawings, there is schematically illustrated a typical control system for one of the assembly stations. The overall control system includes a central controller 200, which may be a CPU logic circuit or any other suitable controller for receiving signals and issuing commands. In the illustrated embodiment, a sensor 114 at a station senses the appropriate signal or proximity of an indicator on a pallet and senses a signal to the controller 200, which reads the signal and issues an appropriate control signal to one or more of a plurality of valves, such as valve 202, which controls a supply of air from source 74 to the lift cylinder 156, for example. The controller may also activate valve 204 to convey a source of air from source 76 to the air cylinder for an assembly pressing function or the like. Alternatively to either of these valves, the controller may send a signal to operate valve 206, which simply retracts cylinder 124 to permit the pallet to pass. Additional sensors, such as a sensor 208, may also be present at the station to issue a signal to the controller 200, which may issue the command to valve 204 as a result of that signal or signals from additional sensors. The controller may control additional valves for controlling additional sensors, gates, feeders or other mechanisms at the assembly station for performing the necessary assembly functions at that particular station. This simplified signaling arrangement requires a minimum communication between the central controller and the many stations along the assembly line.

From the above description, it is seen that we have provided a modular unit of a manufacturing assembly system for forming assembly systems having a selected number of assembly or work stations.

In operation, one or more modular units are selected to accommodate a number of work stations required and to enable the required stations or spacings between the work stations. The modular units are fit together in a manner to accommodate or be accommodated within the space available or around existing assembly or manufacturing equipment. For example, other equipment may be adjacent the present assembly line to provide partially assembled sub-assemblies for the final product. Similarly, the assembly line may be arranged around manufacturing equipment, such as molding equipment, that is in the process of making the parts that go into the system. In one embodiment of the present system for example, parts are manufactured at certain stations along the assembly apparatus.

The system is set up in its desired configuration, and each assembly station is then configured for its particular operation. A series of pallets are selected, and the appropriate fixtures mounted thereon for accommodating the particular item of manufacture. A beginning station of the assembly process and a final station is determined, and the appropriate station apparatus assembled. The stations are appropriately equipped with the necessary pallet stop and sensing units, and the necessary positioning units to position the work piece for the manufacturing operation.

By use of the appropriate sensing mechanisms, a number of different units may be assembled on the same assembly line. For example, sprinkler units having many different orifices may be manufactured on the same assembly line, with for example an option of three different orifices provided by three different orifice assembly stations. The pallets for one particular orifice would be identified by one trigger mechanism, whereas a different orifice would be identified by another trigger mechanism. When the pallet approaches an orifice station if that station and the sprinkler unit is matched, the pallet will be stopped and the orifice mounted in that sprinkler unit. However, should the sprinkler unit not require that orifice, the pallet will be permitted to pass that station and will be stopped by the appropriate assembly station.

In a similar manner, other modifications may be similarly manufactured on a continuous basis. In this manner, the same assembly line can be set up to simultaneously manufacture a number of different variations of the same article of manufacture. It is only necessary that the article to be manufactured be matched through its pallet or some sensing means to the appropriate assembly or manufacturing station.

While we have illustrated and described our invention by means of a specific embodiment, it is to be understood that numerous changes and modifications may be made therein without departing from the spirit and scope of the invention as defined in the appended claims.

We claim:

1. In a modular multi-station assembly system comprising:
    elongated support means including a plurality of support legs, a pair of horizontal tubular beam members defining separate fluid pressure chambers, an upper and a lower support rail for mounting assembly station mechanisms;
    continuous conveyer means comprising an elongated endless conveyer belt extending along said support structure;
    a plurality of pallets for supporting work pieces on said conveyer belt;
    a plurality of deceleration and stop means on said support means for selectively decelerating and stopping selected ones of said pallets;
    indicator means on said pallets for indicating a plurality of selected functions to be performed on said pallet;
    electronic sensing means for sensing said indicator means and generating a signal in response to said indicator means; and
    positioning means on said support structure responsive to said signal for extending upward on opposite sides of said conveyer belt for selectively lifting and positioning selected ones of said pallets above said and out of contact with said conveyer belt for operations on a work piece carried by said pallet.

2. A modular unit system according to claim 1 wherein:
    said lower reference rail comprises an elongated generally rectangular plate mounted below and extending outward on each side of said tubular members.

3. An assembly system according to claim 1 wherein:
    said indicator means comprises at least one cylindrical rod axially moveable to selected positions on said pallet; and
    said sensing means comprises metal sensing means for sensing the proximity of an end of said cylindrical rod.

4. An assembly system according to claim 3 wherein:
    said indicator means includes means for selectively positioning said cylindrical rod.

5. An assembly system according to claim 1 wherein:
    said upper support rail comprises an elongated rectangular plate mounted on a top of said beam members and extending to each side thereof for defining a combination of support table and a rail on each side thereof, said tubular beam members are generally square in cross sectional configuration.

6. An assembly system according to claim 1 wherein:
    said deceleration and stop means comprises a base member for mounting on said top rail;
    a telescoping arm pivotally mounted on said base for extending at least partially onto said conveyer means; and
    spring means for normally biasing said arm to an advanced position on said conveyer.

7. An assembly system according to claim 1 wherein:
    said positioning means comprises a base member for mounting on said lower support rail;

a vertically reciprocable support member mounted on said base for engaging lateral side edges of a pallet for lifting and supporting said pallet above said conveyer; and linear motor means for reciprocating said support member.

8. A modular unit for carrying out multiple assembly operations, comprising:

elongated support means including a plurality of support legs, a pair of elongated horizontal tubular beam members defining separate fluid pressure chambers, an upper rectangular plate mounted above said tubular beam members for defining upper support table and mounting rails and a lower rectangular plate mounted below said tubular beam members for defining lower mounting rails for mounting assembly station mechanisms;

continuous conveyer means comprising an elongated endless conveyer belt extending along opposite sides of said support structure at a position between said upper and said lower mounting rails;

a plurality of pallets for supporting work pieces on said conveyer belt;

indicator means on said pallets for indicating a plurality of selected functions to be performed on said pallet;

electronic sensing means for sensing and generating a signal in response to said indicator means;

a plurality of deceleration and stop means on said support means for selectively decelerating and stopping selected ones of said pallets; and positioning means on said support structure responsive to said signal for extending upward on opposite sides of said conveyer belt for selectively lifting and positioning selected ones of said pallets above and out of contact with said conveyer means for enabling operations on a work piece carried by said pallet.

9. An assembly system according to claim 8 wherein:

said deceleration and stop means comprises a base member for mounting on said top rail;

a telescoping arm pivotally mounted on said base for extending at least partially onto said conveyer means;

means for telescopically extending and telescopically retracting said arm; and spring means for normally biasing said arm to an advanced position on said conveyer.

10. An assembly system according to claim 9 wherein:

said positioning means comprises a base member for mounting on said lower support rail;

a vertically reciprocable support member mounted on said base for engaging lateral side edges of a pallet for lifting and supporting said pallet above said conveyer; and linear motor means for reciprocating said support member.

* * * * *